United States Patent

O'Toole

[15] 3,663,745

[45] May 16, 1972

[54] COMPENSATED TELEVISION MATRIX AMPLIFIERS

[72] Inventor: John J. O'Toole, Cherry Hill, N.J.

[73] Assignee: RCA Corporation

[22] Filed: Sept. 21, 1970

[21] Appl. No.: 74,135

Related U.S. Application Data

[63] Continuation of Ser. No. 693,361, Dec. 26, 1967, abandoned.

[52] U.S. Cl. ......................178/5.4 MA, 330/30 R, 330/30 D

[51] Int. Cl. ......................H04n 9/52

[58] Field of Search ..............178/5.4 SD, 5.4 MA; 328/158; 330/30 R, 30 D, 69, 126

[56] References Cited

UNITED STATES PATENTS

| | | | |
|---|---|---|---|
| 3,506,776 | 4/1970 | Rennick | 178/5.4 SD |
| 3,429,987 | 2/1969 | Altmann | 178/5.4 MA |

OTHER PUBLICATIONS

Color TV Processing Using Integrated Circuits by L. Glaser et al., IEEE Trans. on Broadcast & TV Recr' s. Vol. BTR- 12, pp 54- 59, Nov. 1966.

*Primary Examiner*—Benedict V. Safourek
*Assistant Examiner*—George G. Stellar
*Attorney*—Eugene M. Whitacre

[57] ABSTRACT

A matrix amplifier for color television receivers employs two transistors of opposite conductivity types having their emitters coupled together. The base of a first transistor is coupled to a source of narrow band frequencies, such as color difference signals, which drives the first transistor in a common emitter mode. The base of the second transistor is coupled to a source of wideband signals, such as luminance signals. By virtue of the emitter coupling, the first transistor operates in a common base mode for the wideband signals. A matrixed output of the narrow and wideband frequencies is taken from the collector of the first transistor.

6 Claims, 2 Drawing Figures

INVENTOR
John J. O'Toole
BY Eugene M. Whitacre
ATTORNEY

COMPENSATED TELEVISION MATRIX AMPLIFIERS

This application is a continuation of application Ser. No. 693,361 filed on Dec. 26, 1967 now abandoned.

This invention relates to color television receivers and more particularly to a matrixing amplifier for use in a color television receiver.

In color television receivers, it is common to derive relatively narrow band color difference signals from the chrominance sidebands of a received color television signal. The color difference signals are matrixed with relatively wide band luminance signals either in, or prior to, the color kinescope to provide the desired effects.

In the design of transistorized color television receivers, the voltage drive requirements for color picture tubes place stringent demands on relatively low voltage breakdown transistors. In addition to provide the requisite frequency response, the amplifiers for the various signal components have required the selection of relatively expensive high frequency transistors.

A transistor amplifier circuit embodying the invention includes a transistor device connected for operation in the common emitter mode with respect to a source of narrow band color difference signals and in the common base mode with respect to a source of wide band luminance signals. A transistor amplifier circuit connected in the common base configuration has a frequency bandwidth which is a factor of beta greater than that of the same amplifier circuit connected in the common emitter configuration. In this manner the frequency capabilities of a transistor may be efficiently utilized, with the result that a less expensive transistor may be selected for the circuit.

In accordance with a feature of the invention, a second transistor of opposite conductivity type to that of the first transistor is connected in series with the first transistor. The emitter electrodes of the first and second transistors are connected together, and the wide band luminance signals are applied to the base electrode of the second transistor which is connected in a common collector configuration. A transistor connected in the common collector configuration provides a greater bandwidth capability than a corresponding circuit in the common emitter configuration, thereby reducing the requirements on the second transistor. In addition, since the two transistors are in series, the voltage breakdown requirements to produce the necessary voltage swing to drive the color picture tube is reduced because the total voltage drop is divided between the two transistors.

For a further understanding of the present invention together with other and further objects thereof, reference is had to the following description taken in connection with the accompanying drawings and its scope will be pointed out in the appended claims.

Referring to the drawing.

Figure 1:
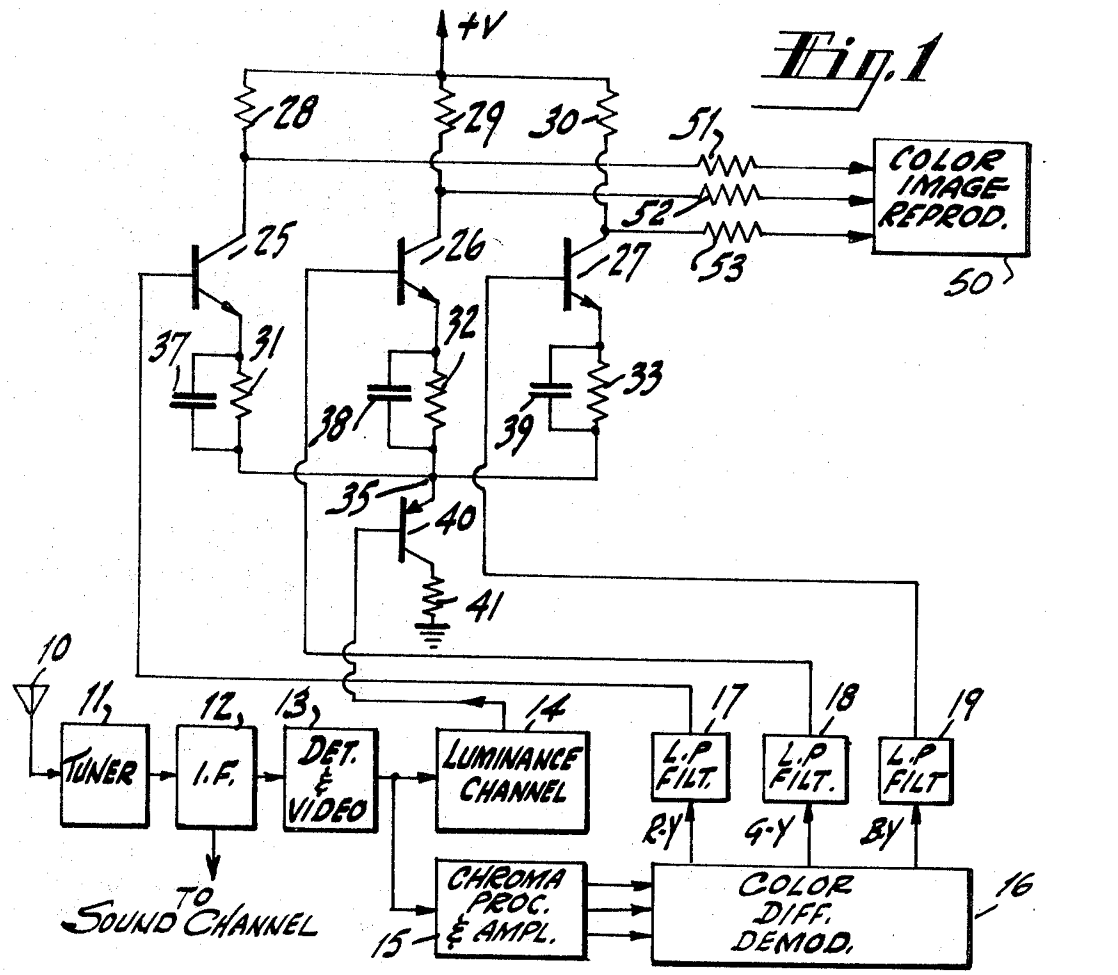
FIG. 1 is a schematic circuit diagram partly in block form, of a color television receiver including a video matrixing amplifier embodying the present invention.

The color television receiver of FIG. 1 includes a tuner 11 coupled to an antenna 10. The tuner 11 includes means to select a desired television signal and to convert the selected signals to corresponding signals of an intermediate frequency (IF). The resultant IF signal which contains a sound carrier wave and a picture carrier wave is further amplified in an IF amplifier 12. The intercarrier beat signal between the sound and picture carrier waves is selected at the output circuit of the IF amplifier and fed to a suitable sound channel, not shown, for amplification and demodulation. The picture carrier wave amplified by the IF amplifier 12 is coupled to a video detector and video amplifier channel 13 which derives the composite video signal, and amplifies the derived signal to a level suitable for use in subsequent circuits of the color television receiver.

One output of the video detector and amplifier 13 is coupled to a luminance channel 14, and a second to a chrominance processor and amplifier portion 15. The luminance channel 14 is the wide band channel which is also referred to in the art as the Y channel and contains the information necessary to reproduce a monochrome or black and white picture. As is known, the luminance channel 14 includes a suitable delay line, not shown, for compensating the differences in translation time of the chrominance and luminance signals.

The chrominance processor and amplifier 15 performs the following functions. First, it separates the color bursts from the remainder of the composite signal; second, the color bursts are used to synchronize a 3.58 MHz color oscillator to thereby generate a reference subcarrier for demodulation of the chrominance components; and third, the chrominance components of the composite video signal are amplified by a bandpass amplifier.

The amplified chrominance components and the reference waves from the chroma processor and amplifier 15 are applied to color demodulator 16 which demodulates chrominance components at the desired phases to produce at its respective outputs color difference signals which in the present case are represented as the (R–Y), (G–Y) and (B–Y) signals. The three color difference signals are each coupled to a low pass filter 17, 18 and 19 respectively. The low pass filters present a low shunt and high series impedance to relatively high frequency signals, that is signals whose frequencies are above those of the desired color difference signals. It will be understood that each of the portions of the receiver shown in block form may be referenced to a point of fixed potential, such as ground, not shown. Hence, the shunt impedance of the low pass filters referred to above is from the respective R–Y, G–Y and B–Y terminals to ground.

The signal outputs of the low pass filters 17, 18 and 19 are applied respectively to the base electrodes of the transistors 25, 26 and 27. The collector electrodes of transistors 25, 26 and 27 are each coupled to a source of potential indicated as +V through collector load resistors 28, 29 and 30 respectively. In a similar manner the emitter electrodes of transistors 25, 26 and 27 are coupled through a separate emitter resistor 31, 32 and 33, to a common junction point 35. Each of the respective emitter resistors 31, 32 and 33 is bypassed for high frequencies by individual capacitors 37, 38 and 39 respectively.

The common junction point 35 is returned to a point of reference potential, such as ground, through the emitter to collector path of a transistor 40 which is of an opposite conductivity type relative to transistors 25, 26 and 27. The collector electrode of transistor 40 is connected to ground through a current limiting resistor 41. Wide band signals from the luminance channel 14 are applied between the base electrode of the transistor 40 and ground.

The collector electrodes of transistors 25, 26 and 27 are each respectively coupled via resistors 51, 52 and 53 to an appropriate electrode of a color image reproducing device 50, which may for example, be a three gun type shadow mask kinescope.

The operation of the circuit is as follows. The transistors 25, 26 and 27 operate in the common emitter mode for the narrow band color difference signals applied to their base electrodes and in the common base mode for wideband luminance signals applied to the emitter electrodes. A common base amplifier has a bandwidth improvement with a factor of beta over the common emitter configuration. The above described circuit possesses the advantage that the transistors 25, 26 and 27, operating in the common emitter mode, can provide high power gain to the narrow band color difference signal. This results from the fact that a relatively high collector load resistor can be used to achieve the necessary bandwidth for the color difference signals. Consequently, a relatively large voltage swing is obtained with low current drive. In addition the same transistors 25, 26 and 27 operating in the common base mode provide wider band amplification accompanied by a high voltage gain for the wide band luminance signal.

In the circuit of FIG. 1, the voltage gains for the color difference and luminance signals may be made equal for a specified collector resistor. It is understood that the gain in the common base mode is partly determined by the beta of the transistor and the total impedance terminating the base to a point of reference potential, such as ground. The common base gain being highest for a relatively high beta transistor with an effective ac short circuit for a relatively low ac impedance terminating the base to ground at the higher frequency components of the luminance signal. In this manner the low pass filters 17, 18 and 19 are designed so that their output impedances, which are the source impedances seen by the bases of transistors 25, 26 and 27, present a relatively low impedance termination to ground for the frequencies contained in both the color difference signals and the luminance signals. For frequencies not within the color difference band and hence those corresponding to higher frequency luminance signals a decrease in gain in the common base mode due to the increasing filter impedance can be compensated for by the peaking capacitors 37, 38 and 39 which appear across the respective emitter resistors 31, 32 and 33. In any case if a fairly high beta transistor is employed for transistors 25, 26, and 27 a relatively large impedance at the base can be tolerated while still serving to afford a high common base voltage gain.

The series connected transistors are capable of providing adequate voltage swing to the color picture tube because the total voltage is divided between the two transistors. In addition, the dual bandwidth feature of the circuit places less stringent demands on the frequency response characteristics of the transistors and permits readily available and economical transistors to be used in the circuit. The fact that the series connected transistors are of opposite conductivity type reduces the number of circuit components thereby further improving the circuit from a cost stand point. The selection of opposite conductivity transistors in the circuit serves to function as compatible driving sources for each other. This is so because the input impedances seen looking into the emitter of the PNP transistor 40 is low for signals applied to the bases of transistors 25, 26 and 27; while, in turn, the low output impedances of transistor 40 can easily drive the relatively low input impedances seen looking into the emitters of transistors 25, 26 and 27 for the luminance signal. The reduced bandwidth exhibited by transistors 25, 26 and 27 in the common emitter mode is sufficient as the bandwidth of the color difference signals, is narrower than that of the luminance signal. Therefore in this manner the transistors 25, 26 and 27 can efficiently respond to both the luminance signal and the color difference signal in the emitter circuits to provide at their respective electrodes a color signal as red, green or blue which can then be applied directly to the appropriate electrode of the image reproducer or kinescope 50.

To obtain the proper amplitude or drive for the electrodes of the kinescope 50, resistors 51, 52 and 53 may be selected to provide the most pleasing display and hence afford proper color reproduction and proper monochrome gray scale. In a similar manner the emitter resistors 31, 32 and 33 may be selected to produce the same results. This is so because the approximate gain of transistors 25, 26 and 27 in the common base mode is primarily determined by the ratio of the collector resistors with the emitter resistors. Therefore by choosing a different size emitter resistor as 31, 32 and 33, for each stage a different gain is obtainable for the luminance component. However, in actual practice it is desired to keep the gain ratio constant for each stage to aid in dc tracking of the kinescope 50.

Figure 2:
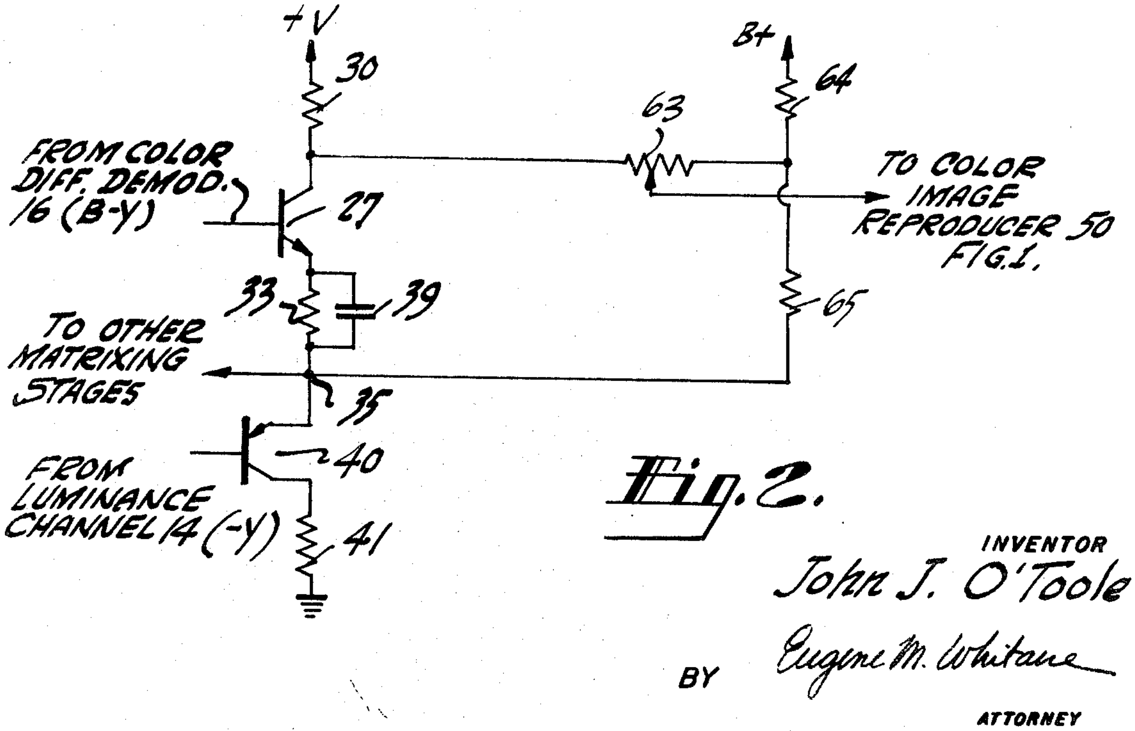
FIG. 2 is a simplified schematic circuit diagram of a matrix amplifier illustrating another embodiment of the invention.

FIG. 2 shows a single matrixing amplifier, for example, the amplifier shown in FIG. 1 to produce the blue signal and therefore for the sake of clarity identical numerals were retained to describe similar parts. Transistor 27 has applied to its base the B–Y signal obtained from a color difference demodulator as 16 of FIG. 1. The emitter of the transistor 27 is again coupled through the resistor 33 to the common collector luminance driver 40. From observation, it is apparent that for the signal B–Y coupled to the base of transistor 27 and a –Y signal coupled to the base of transistor 40 the collector signal of transistor 27 used to drive the kinescope electrode, is – Y – B+Y, which is equal to B or the blue color signal.

Another means of coupling to the kinescope, to provide the capability of adjusting the color temperature or backgrounds of the kinescope display is shown. The collector electrode of transistor 27 is coupled to one terminal of a variable resistor 63 whose other terminal is coupled to the junction of a voltage divider comprising resistors 64 and 65 coupled in series between a source of potential designated as B+ and a common junction point 35 previously described in FIG. 1. The variable arm of resistor 63 is coupled directly to the appropriate electrode of a kinescope or a color image reproducer. Such an electrode may be the grid or cathode of the kinescope depending on signal polarity desired. In this manner one can control the quiescent dc bias applied to the electrode of the color image reproducer while further serving to control the amplitude of the color signal, both the dc and ac, applied thereto. The same type of resistive coupling scheme could be added to the output of each matrixing amplifier shown in FIG. 1 to provide for color temperature adjustment or gray scale tracking adjustments of the color image reproducer or shadow mask picture tube 50.

The circuit shown in FIG. 2 performed as a matrix amplifier using the following values:

| | |
|---|---|
| Resistor **30** | 10,000 ohms |
| Resistor **33** | 82 ohms |
| Capacitor **39** | .0033 microfarads |
| Resistor **63** | 5,000 ohms |
| Resistor **64** | 6,800 ohms |
| Resistor **65** | 27,000 ohms |
| Resistor **41** | 47 ohms |
| Transistor **27** | SE7010 (NPN) |
| Transistor **40** | 2N3502 (PNP) |

What is claimed is:

1. An amplifier for matrixing a luminance signal with a color difference signal of the type employing a first transistor of a specified conductivity having an emitter electrode coupled to an emitter electrode of a second transistor of an opposite conductivity, said first transistor having said color difference signal applied to the base electrode thereof, and said second transistor having said luminance signal applied to said base electrode thereof, said first transistor operating in a common emitter mode for said color difference signals and in a common base mode for said luminance signals, said gain in said common base mode being a function of the magnitude of the impedance at the base electrode of said first transistor, the improvement therewith comprising, a. a circuit having a predetermined frequency response coupled to the base electrode of said first transistor, said circuit undesirably increasing in impedance for higher frequency luminance signals, which impedance increase undesirably reduces said common base gain to thereby adversely affect matrixing, and b. a frequency selective network coupling the emitter electrode of said first transistor to the emitter electrode of said second transistor, and selected to provide an increasing signal to said first transistor's emitter for those higher frequency luminance signals at which said magnitude of said circuit coupled to said base of said first transistor increases.

2. The amplifier according to claim 1 wherein, said frequency selective network comprises a resistor connected in parallel with a capacitor.

3. An electrical circuit for matrixing a color difference signal occupying a first band of frequencies with a luminance signal occupying a second wider band of frequencies for providing a color signal comprising:

a. first and second transistors of opposite conductivity types, each having a base, collector and emitter electrode, b. means including a frequency selective network for coupling the emitter electrode of said first transistor to the emitter electrode of said second transistor, c. input circuit means for said color difference signal coupled between the base electrode of said first transistor and a point of reference potential, said input circuit means providing at the base electrode of said first transistor a low impedance termination for said luminance signals, d. input circuit means for said luminance signal coupled between the base electrode of said second transistor and said point of reference potential to operate said first transistor in a common base mode for said luminance signals, said frequency selective means serving to compensate for any changes in common base gain due to a variation in said magnitude of said low impedance termination for said luminance signals at the base electrode of said second transistor, e. output utilization means coupled to said collector electrode of said first transistor.

4. An amplifier for matrixing signals in a first band of frequencies with signals in a second band of frequencies having a bandwidth substantially greater than said first band, comprising, a. a first transistor of a specified conductivity having a base, collector and emitter electrode, b. a second transistor of opposite conductivity having a base, collector and emitter electrode, c. means for applying operating potential between said first and second transistor's collector electrodes, d. first signal input circuit means for signals in said first band of frequencies, coupled to the base electrode of said first transistor, said input circuit means having a bandwidth capable of passing said first band of frequencies and an impedance for providing a signal bypass for frequencies above said first band of frequencies and within said second band of frequencies, e. second signal input circuit means for signals in said second band of frequencies, coupled to the base electrode of said second transistor, f. means coupling the emitter electrode of said first transistor to the emitter electrode of said second transistor, said means including means for compensating for any change in impedance of said first signal input means at frequencies within said second band of frequencies, g. means coupled to said collector electrode of said first transistor for utilizing the matrixed output of said first and second band of frequencies produced thereby.

5. The amplifier according to claim 4 wherein said means coupling the emitter electrode of said first transistor to the emitter electrode of said second transistor include a resistor in parallel with a capacitor.

6. In a color television receiver having a color television signal processing path including at least a color demodulator operative to produce a separate color difference signal for each primary color, said processing path including a luminance channel for amplifying a monochrome component contained within said color television signal, in combination therewith, apparatus for matrixing said color difference signals with said monochrome component, comprising, a. first, second and third transistors of specified conductivity, each having a base, emitter and collector electrode, b. a fourth transistor of opposite conductivity having a base, emitter and collector electrode, c. means coupling said collector electrode of said fourth transistor to a point of reference potential, d. first, second and third low pass filters having a low output impedance at said luminance channel frequencies within said color difference frequency band, e. means for coupling said first low pass filter between said first transistor's base and an output of said color demodulator for providing one separate color difference signal to said first transistor, means for coupling said second low pass filter between said second transistor's base and a second output of said color demodulator for providing another color difference signal to said second transistor and means for coupling said third low pass filter between said third transistor's base and still another output of said color demodulator for providing still another color difference signal for said third transistor, f. first, second and third frequency selective networks each separate one coupled between the emitter electrode of one of said first, second and third transistors and the emitter electrode of said fourth transistor, to compensate said first, second and third transistors for any variation of said low output impedance at said base electrodes due to frequencies of said luminance signals not within said color difference frequency band, g. means coupled to the base of said fourth transistor for driving said first, second and third transistors with said monochrome component in a common base mode, h. means coupled to said first, second and third transistors' collector electrodes for utilizing a signal produced at said electrodes, said signal at said collector electrodes varying in accordance with said corresponding transistor base-associated color difference signal and said luminance signal.

* * * * *